(12) United States Patent
Lee

(10) Patent No.: US 7,217,021 B2
(45) Date of Patent: May 15, 2007

(54) THREE-DIMENSIONAL DECORATIVE LIGHTING

(76) Inventor: Jean-Hway Lee, P.O. Box No. 6-57, Junghe, Taipei 235 (TW)

( * ) Notice: Subject to any disclaimer, the term of this patent is extended or adjusted under 35 U.S.C. 154(b) by 57 days.

(21) Appl. No.: 11/068,768

(22) Filed: Mar. 2, 2005

(65) Prior Publication Data
US 2005/0201089 A1   Sep. 15, 2005

(30) Foreign Application Priority Data
Mar. 11, 2004   (TW) .............................. 93203701 U

(51) Int. Cl.
*G02B 6/00* (2006.01)
(52) U.S. Cl. ....................... 362/551; 362/554; 362/558; 362/565; 362/576; 362/581; 362/806; 362/807; 362/808; 362/809
(58) Field of Classification Search ................ 362/551, 362/554, 558, 565, 576, 581, 806–809
See application file for complete search history.

(56) References Cited

U.S. PATENT DOCUMENTS 4,965,701 A * 10/1990 Voland ........................ 362/565
6,086,235 A * 7/2000 Chen .......................... 362/565
2003/0235049 A1 * 12/2003 Wu ............................. 362/252

* cited by examiner

*Primary Examiner*—Stephen F Husar
*Assistant Examiner*—Meghan K. Dunwiddie
(74) *Attorney, Agent, or Firm*—Troxell Law Office, PLLC

(57) ABSTRACT

A three-dimensional decorative lighting particularly structured to include a plurality of light emitting tubes enclosing bundles of optical fibers, and parallel arranged in a circle to form a cylindrical decorative lighting that can be transformationally shaped. The light emitting tubes can hang straight under their own weight, and each are fabricated from a transparent protective sleeve, within which a plurality of the plastic optical fibers are disposed. A plurality of light spot generating windows are distributed on a circumferential surface of each of the optical fibers. A manually manipulable binding connector affixes each of the light emitting tubes to a base plate, thereby enabling the light emitting tubes to hang down, and further facilitates manually transforming structural form of the decorative lighting. Ends of the light emitting tubes are prevented from being contaminated, thus avoiding influencing or obstructing light transmission, and realizing an integrated luminescent display.

9 Claims, 10 Drawing Sheets

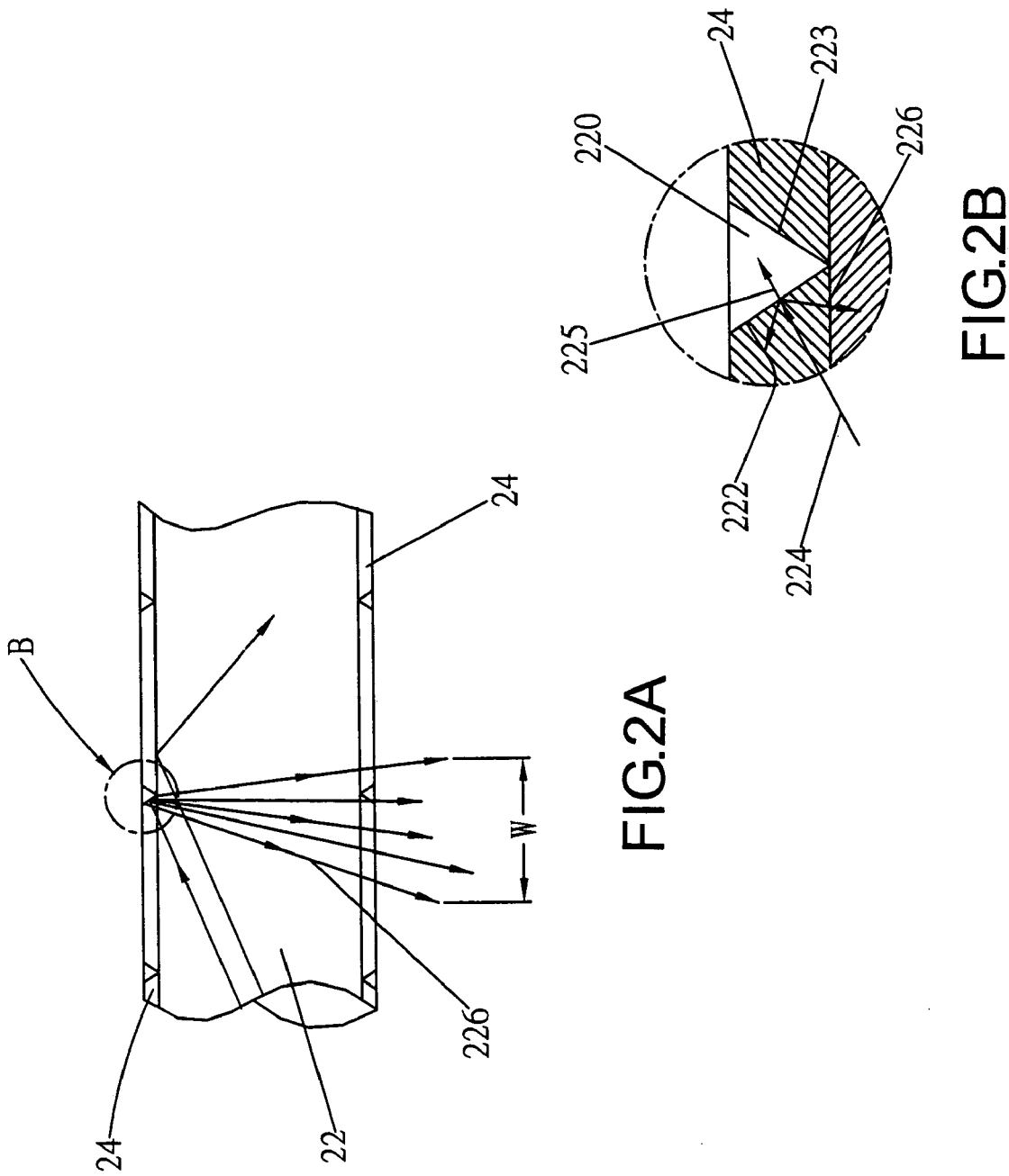

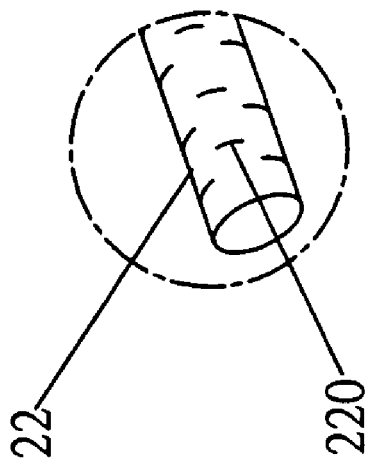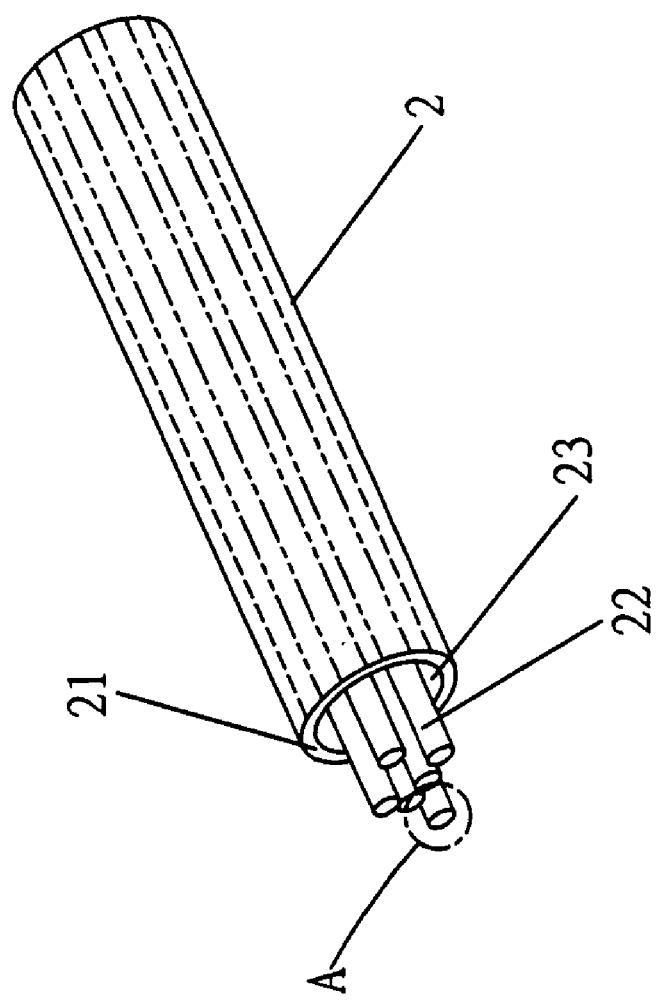

THREE-DIMENSIONAL DECORATIVE LIGHTING

BACKGROUND OF THE INVENTION (a) Field of the Invention

The present invention relates to a three-dimensional decorative lighting, and more particularly to an improvement in structural assemble of a three-dimensional decorative lighting constructed from optical fibers, especially providing a configuration that enables free transformation in design and characteristic arrangement of the optical fibers, thereby realizing integration of points, lines and surface-like luminescence to manifest an integral lighting display.

(b) Description of the Prior Art

The flexible nature of plastic optical fiber material enables free flexing and disposition thereof, and the light streams transmitted along the optical fibers create luminescence according to processing conditions of a light source, and has thereby created a new field of application of optical fiber material in decorative lighting.

The inventor of the present invention formerly used a plurality of fiber optic rods having thick cross-section, and which were parallel arranged to form a cylindrical hanging decorative lighting. After installing on a ceiling, the fiber optic rods hang down under their own weight, thereby forming a cylindrical decorative lighting configuration. Crystal bright resplendent straight light emerges from light expanders respectively configured to ends of the fiber optic rods. The decorative lighting produces shining light transmission with additional aesthetic colorful viewing by means of variable color saturation of a light source.

Referring to FIGS. 1 and 1A, which show a prior art embodiment basically structured from a plurality of thick cross-sectional single core fiber optic rods 11, which are assembled in a parallel circling arrangement to form a cylindrical hanging light 1. Body of the fiber optic rods 11 respectively penetrate through holes 131 of a base plate 13, and are gathered together in a terminal guide connecting light source 10. Hanging free ends of the fiber optic rods 11 are respectively connected into connection grooves 121 respectively defined on light expanders 12, and a bonding agent 120 bonds the fiber optic rods 11 to the light expanders 12. Use of the thick fiber optic rods 11 provides sufficient carrying capability for light transmission.

A similar bonding method is used between the body of each of the fiber optic rods 11 and the through holes 13, thereby fixing length of each arrangement of the fiber optic rods 11. A further objective of the bonding is to avoid movement and consequent damage to circumferential reflecting layers of the fiber optic rods 11.

However, conventional portions of the hanging light 1 must be constructed by engineering personnel, and after manufacturing, the fiber optic rods 11 are rolled up and packed, thus, after unrolling, the fiber optic rods 11 retain a stressed curve, and are, therefore, unable to hang straight, thereby causing the decorative lighting to lose its straightforward aesthetics. Moreover, because only the light expanders 12 include light-emitting bright areas, thus, only light streams released from the light expanders 12 can be viewed.

Referring to FIG. 1A, because each of the light expanders 12 and the fiber optic rods 11 are bonded together with a bonding agent 120, during course of hardening of the bonding agent 120, flow occurs within the connection grooves 121, thus tainting a projecting end 110 of each of the fiber optic rods 11, thereby forming a light trap for the emerging light stream, which, thus, spoils effectiveness of light transmission.

Furthermore, working procedure is slow because of the bonding method used in the light expanders 12. Moreover, the expanders 12 cannot be freely dismantled for replacement, thereby causing a corresponding increase in safe stockpiling, and further inhibiting free replacement of structural style of the light by a user in order to accommodate atmosphere of different occasions or festivals.

Furthermore, because of the fixing method used to secure the base plate 13 to a ceiling or high location, and because the body of the fiber optic rods 11 are fixed to the base plate 13, thus, length of the fiber optic rods 11 cannot be adjusted, which, thus, also restricts structural styling or shaping of the entire decorative light body.

In addition, because the bonding agent 120 used in the bonding method is subjected to transmitted light waves from the fiber optic rods 11, there is the possibility that infrared rays or ultraviolet light waves are retained within the bonding agent 120, which, after a period of time, will produce degradative damage to the structure of the bonding agent 120, resulting in loosening of the bonding and risk of structural members falling off.

SUMMARY OF THE INVENTION

In order to resolve the problem of hanging straight, and form a decorative light of cylindrical form having an effective luminescent surface that has sufficient light transmission capacity, the present invention particularly uses a plurality of filamentary optical fibers, which are gathered and bundled together. The optical fibers are then disposed in a protective sleeve, and because of the minute diameter of each of the optical fibers, thus, retained stress is relatively small, and flexing of the protective sleeve causes mutual differential displacement between the optical fibers, which enables the optical fibers to naturally hang straight down. A plurality of light spot generating miniature windows are defined at different angular positions on a circumferential surface of each of the optical fibers. A plurality of the optical fibers having multiple light emitting points are bundled together to form a surface-like luminescent effect, thereby structuring a cylindrical decorative light that creates a cylindrical luminescent form, which displays an integrated expanded decorative light effect having sufficient light transmission effectiveness, and realizes a resplendent luminescent effect.

A primary objective of the present invention is in providing a plurality of the light emitting tubes arranged in a circle to form a cylindrical decorative light. An end of each of the light emitting tubes is connected to a light expander through a flexible binding collar, which facilitates replacement of the light expander. Furthermore, a manually manipulated binding connector affixes a body portion of the light emitting tube to a base plate, thereby facilitating manual transformation of structural form of the decorative light.

A second objective of the present invention is to further attach a transparent supporting member to a lower end of each of the light emitting tubes at a position above the light expander, which is used to assist in increasing gravitational mass thereof, thereby adding enforcement to cause the light emitting tube to hang straight down.

A third objective of the present invention is to further dispose a flexible metal support wire within each of the light emitting tubes adjacent to the optical fibers therein, and after manual flexing of the light emitting tubes to form a curved shape, the support wires enable fixing the final structural form thereof.

A fourth objective of the present invention is to further use an optical extension cable to extend light stream transmission.

A fifth objective of the present invention is to further provide a box-like space above the base plate, which provides for direct disposing of a light source therein, and an electric cable extending out from the box is connected to an electric supply, thereby forming a single decorative light that facilitates installation by a user.

A sixth objective of the present invention is to further provide for free ends of a portion of the light emitting tubes to respectively curve back towards the ceiling and be affixed to an upper portion of the fixture, thereby forming arch-shaped lines. After such a radialized distribution of the light emitting tubes, an amplified circular bloom-like decorative lighting arrangement is formed therefrom.

To enable a further understanding of said objectives and the technological methods of the invention herein, brief description of the drawings is provided below followed by detailed description of the preferred embodiments.

BRIEF DESCRIPTION OF THE DRAWINGS

FIG. 2A shows a schematic view of light spot generation of an optical fiber according to the present invention.

FIG. 2B shows a schematic view of a window of the light emitting tube emitting light according to the present invention.

FIG. 3 shows a structural elevational view of the light emitting tube according to the present invention.

FIG. 3A shows a schematic view of the window defined on a surface of the optical fiber according to the present invention.

DETAILED DESCRIPTION OF THE PREFERRED EMBODIMENTS

Figure 1:
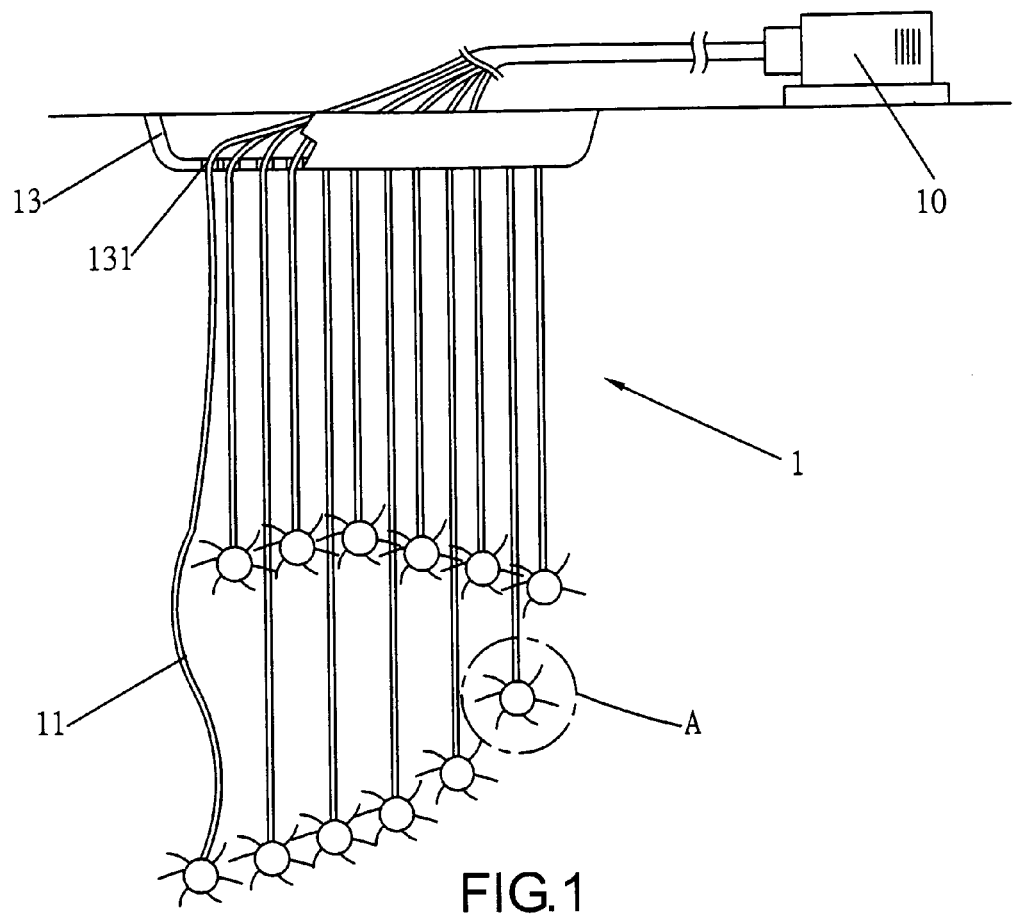
FIG. 1 shows a structural schematic view of a conventional optical fiber hanging light.
Figure 1A:
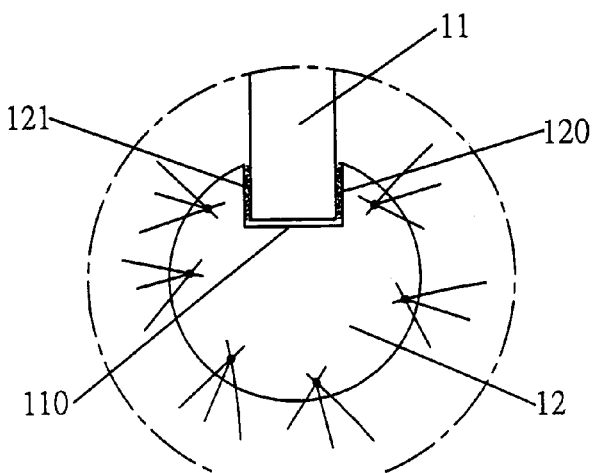
FIG. 1A shows a structural view of a conventional structure using optical fibers and light expanders.
Figure 2:
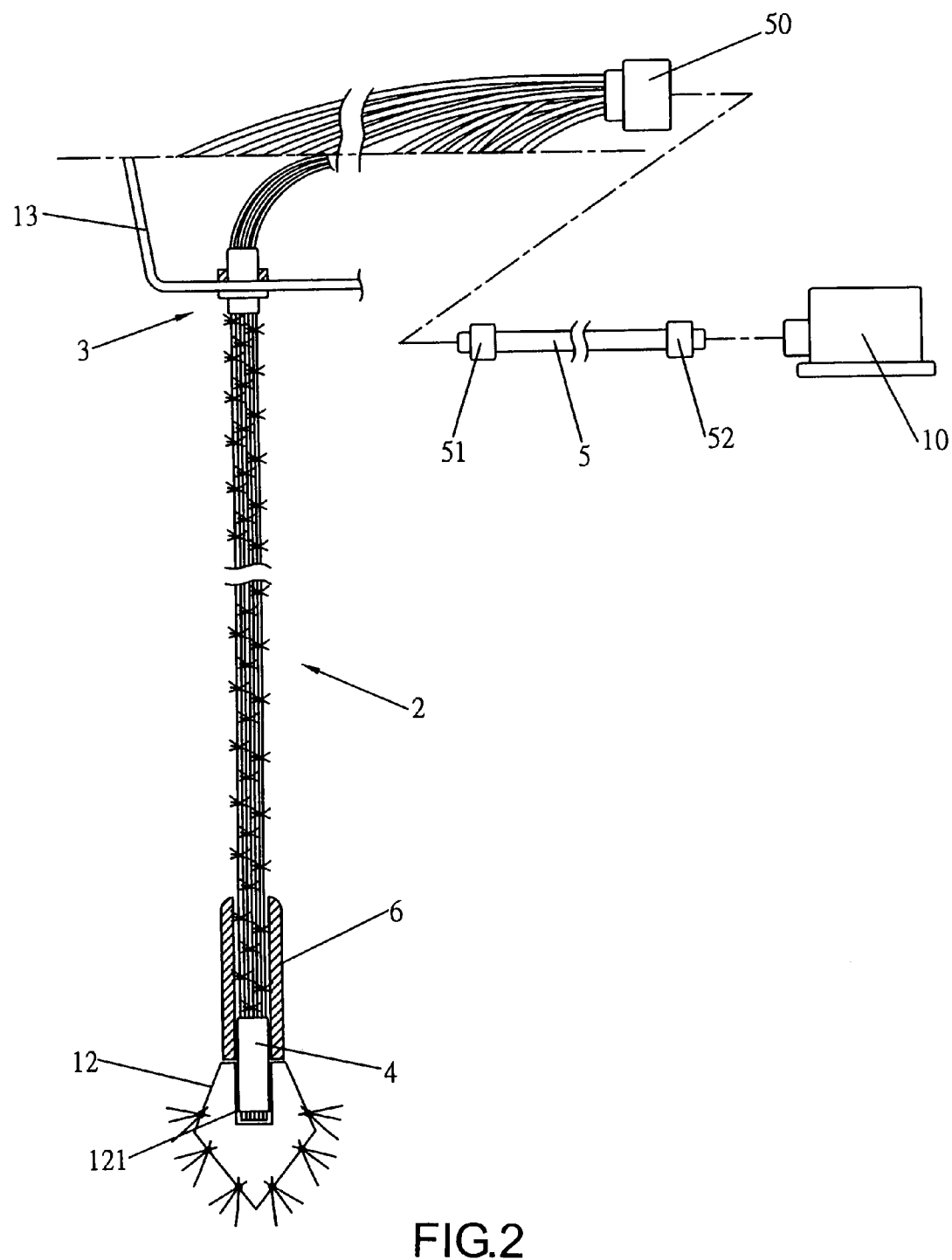
FIG. 2 shows a schematic view of a light emitting tube connection method according to the present invention.

Referring to FIG. 2, which shows the present invention primarily structured so that a body of a light emitting tube 2 passes through a binding connector 3 and secured to a base plate 13. A lower end of the light emitting tube 2 passes through a binding collar 4 and connects to a light expander 12.

Wherein the light emitting tube 2 (see FIG. 3) is structured from a plurality of optical fibers 2, which are bundled together and disposed within a transparent protective sleeve 21. A clearance 23 is retained within the transparent protective sleeve 21 after the optical fibers 22 have been disposed therein, which provides for free relative movement between the optical fibers 22 or free relative movement between the optical fibers 22 and an inner circumferential surface of the protective sleeve 21. Hence, when flexing the light emitting tube 2, because of variation in curvature and length of the correspondingly flexed optical fibers 22 within the light emitting tube 2 (contrary to when hanging straight), thus, free relative differential displacement of the optical fibers 22 is produced. Moreover, practical necessity for existence of the clearance 23 ensures no close interference occurs between the optical fibers 22, and, thus, the light emitting tubes 2 naturally hang down. Furthermore, because of the minute diameter of each of the optical fibers 22, thus, the retained stress is small, and the optical fibers 22 will not mutually interfere, which thus facilitates bundling together of a plurality of the optical fibers 22, and effective transmission of a large volume of light.

Referring to FIG. 3A, a plurality of light spot generating miniature windows 220 are distributed on a circumferential surface of each of the optical fibers 22. The light emitting tube 2 guides the light, and a plurality of tubular distributed bright spots are created by means of the distributed plurality of windows 220.

Referring to FIGS. 2A and 2B, the windows 220 are respectively defined on the circumferential surface of the optical fibers 22 by cutting open a reflecting layer 24, thereby forming inclined surfaces 222 and 223 at each of the windows 220, wherein at least one is a smooth mirror surface. The light spots are created by the inclined surface 222 causing a light splitting effect on an incident light 224, a portion of which is reflected towards another side as a reflected light 226, and a portion passes through the surface 222 as a through light 225, which is projected outward from the window 220. Moreover, light wave interference creates bright light spots.

Curvature refraction caused by a circular cross-section of a core of each of the optical fibers 22 produces a lens amplification effect, and, after amplification of the reflected light 226 from the inclined surface 222, the amplified light is refracted out as an expanding angle fan-shaped light stream from the other side of the optical fiber 22 opposite the window 220 (see FIG. 2B), whereby multiplication of light reflected at different angles from the inclined surface 222 forms a longitudinal expanded light spot of range W.

Referring to FIG. 2, the light emitting tube 2 is connected to and separated from the light expander 12 by means of the binding collar 4.

Any affixing method can be used to join the binding collar 4 to the connection groove 121.

If there is a need to increase hanging acting force of the light emitting tube 2, then a tubular supporting member 6 can be attached on a shoulder portion of a top end of the light expander 12, which is used to assist in increasing gravitational mass thereof.

Light input ends of a plurality of the light emitting tubes 2 are gathered together in a coupler 50, which serves as a light source guide. Furthermore, light stream transmission is propagated through an optical extension cable 5 between the coupler 50 and the light source 10, and uses connectors 51, 52 along the optical extension cable 5 to butt joint the light source 10 to the coupler 50.

Figure 4:
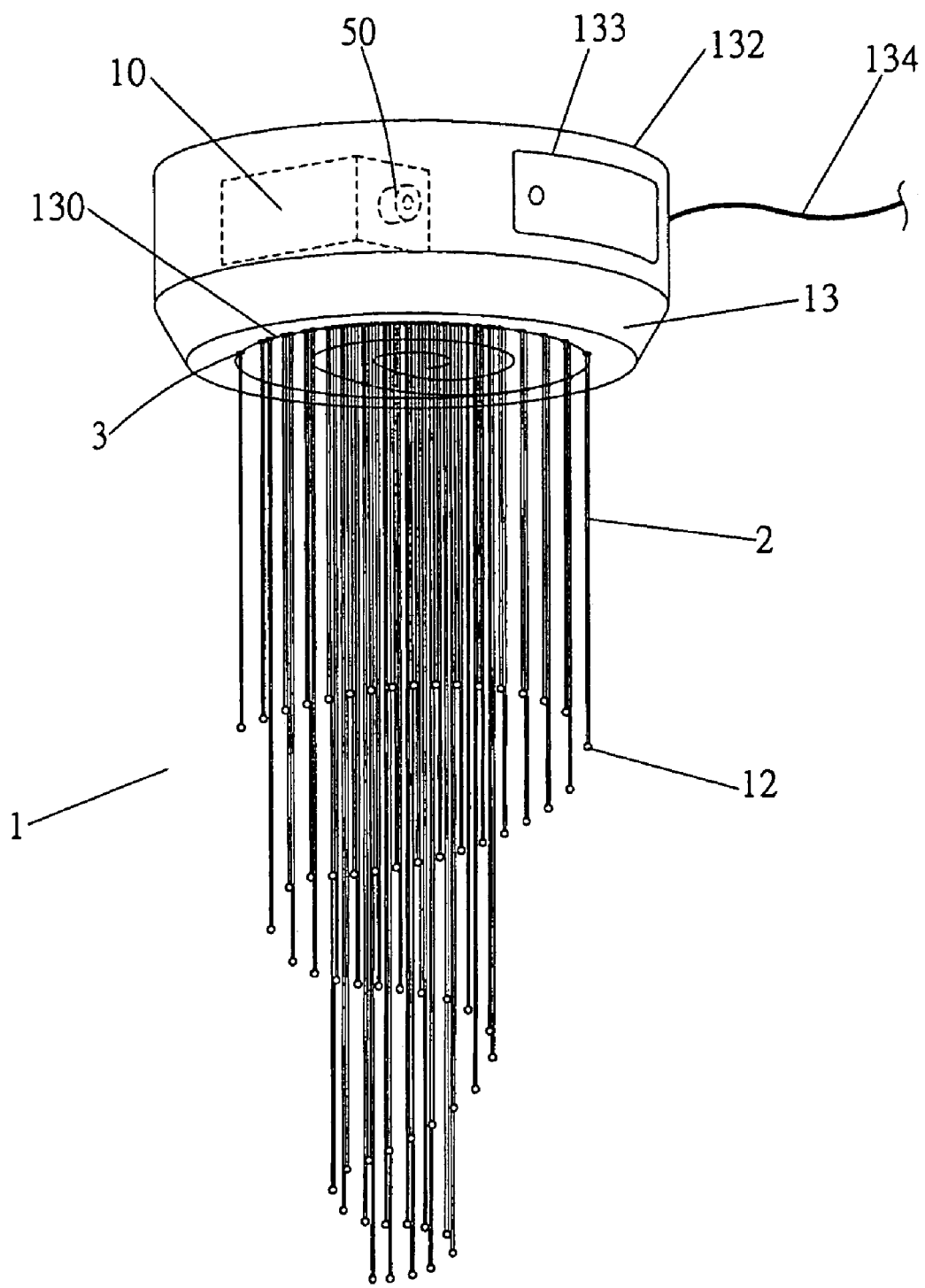
FIG. 4 shows an outward appearance of an embodiment according to the present invention.

Referring to FIG. 4, in order to further facilitate replacement of a traditional lighting at the original location thereof, a box 132 can be further mounted on an upper portion of the base plate 13. A hand opening 133 for maintenance use is defined on the box 132. The light source 10 is directly installed within the box 132, and directly connects to the coupler 50. An electric cable 134 extends out from the box 132 to supply electric power.

A cylindrical decorative hanging lighting is formed after combining and parallel arranging a plurality of the aforementioned light emitting tubes 2. A hanging light 1 is structured from the plurality of light emitting tubes 2 positioned in accordance with design of the base plate 13. If a lower surface of the base plate 13 is pre-defined with a helical-shaped array line 130, and a plurality of the binding connectors 3 are pre-installed at positions spaced at intervals along the array line 130, then each of the binding connectors 3 provide for disposing one of the light emitting tubes 2 therein, each of the lighting tubes 2 hanging down therefrom. Because the binding connectors 3 are respectively installed at positions spaced at intervals along the helical-shaped array line 130, thus, the light emitting tubes 2 hang down parallel to each other, thereby forming a helical three-dimensional cylindrical light emitting hanging light. An extensive distribution of a plurality of the windows 220 on the surface of each of the light emitting tubes 2 forms a plurality of bight light spots, an accumulation of which forms a surface-like light luminescent effect. The light expander 12 of the lower end of each of the light emitting tubes 2 assembled to form a cylindrical luminous body emits a large volume of light, thereby effectively simulating a shining crystal light.

According to the aforementioned disclosures of the present invention, apart from simulating resplendence of the crystal hanging light, moreover, the present invention uses an expansive light emitting cylindrical form structured from the plurality of light spots along the surface of each of the light emitting tubes 2, to create an intensive and elegant aesthetic display.

Figure 5:
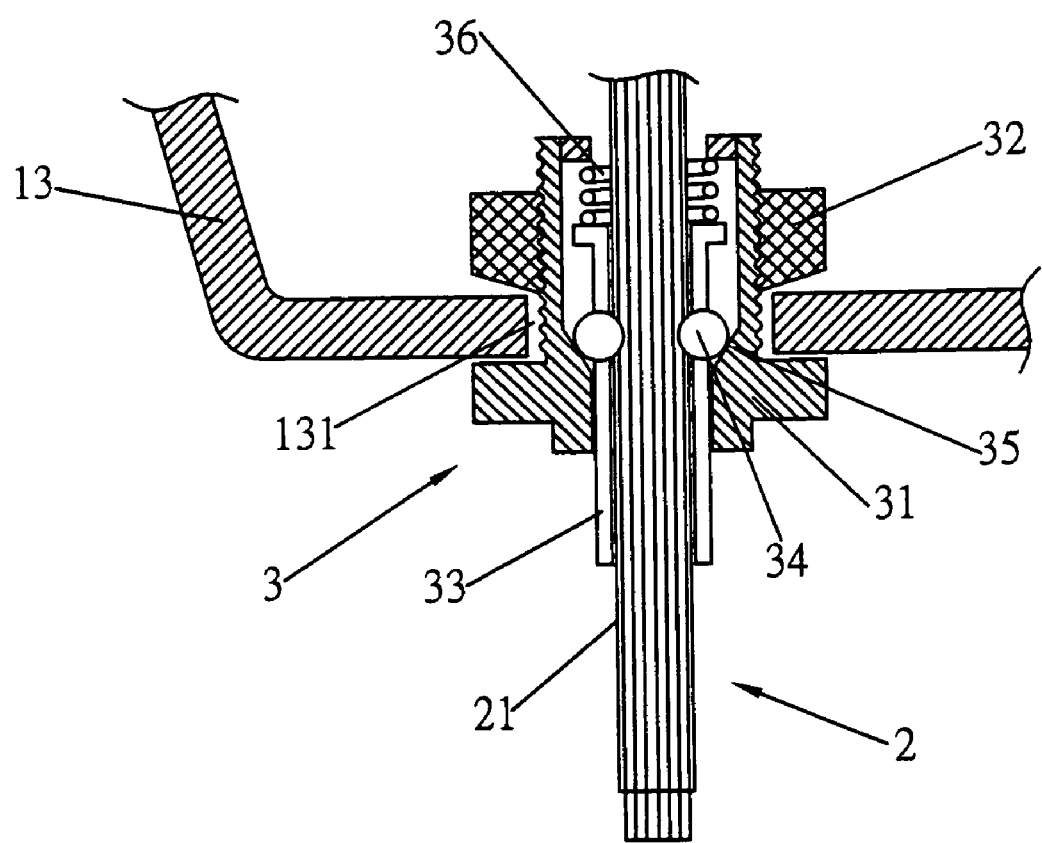
FIG. 5 shows a schematic view of a connecting method between the light emitting tube and a base plate according to the present invention.

Referring to FIG. 5, which shows the structural relationship between the light emitting tube 2 and the binding connector 3, and connection of the light emitting tube 2 to the base plate 13. Wherein a safety nut 32 is first screwed onto an outer tube 31 to secure it in a through hole 131 defined on the base plate 13. Each of the through holes 131 are distributed at intervals and positioned above the helical-shaped array line 130 depicted in FIG. 4. Ball bearings 34 are respectively moveably disposed at an appropriate position of an inner tube 33, and roll on an inclined surface 35 between the inner tube 33 and the outer tube 31. A spring 36 is disposed on an upper portion of the inner tube 33, and effectuates a downward pressure, which pushes the inner tube 33 against the ball bearings 34, thereby pressing the ball bearings 34 down the inclined plane 35, and forcing the ball bearings 34 to clamp the circumferential protective sleeve 21 of the light emitting tube 2.

The binding action of the ball bearings 34 is similar to a general quick connector, effecting inward radial pressure on the light emitting tube 2, thereby preventing the light emitting tube 2 from falling down.

In order to further adjust hanging length of the light emitting tube 2 so as to transform structural shape of the light, then the inner tube 33 is pressed upward, thereby forcing the ball bearings 34 to release their grip on the inner tube 33 and allowing free lengthwise displacement of the light emitting tube 2, which, thus, facilitates adjusting the hanging length of the light emitting tube 2. Apart from the aforementioned circumferential contact braking method of the ball bearings 34, moreover, application of other rod-form binding mechanisms can also be used to achieve the aforementioned binding connector 3, which primarily allows the user to manually manipulate and adjust the hanging length of the light emitting tube 2, and are equally included within the range of claims as disclosed in the present invention.

The primary condition for the binding connector 3 to be adopted by the present invention is that it can be fixed to the base plate 13, and can form a clamp coupling to a girth of the light emitting tube 2 without damaging the optical fibers 22 within the light emitting tube 2.

Figure 5A:
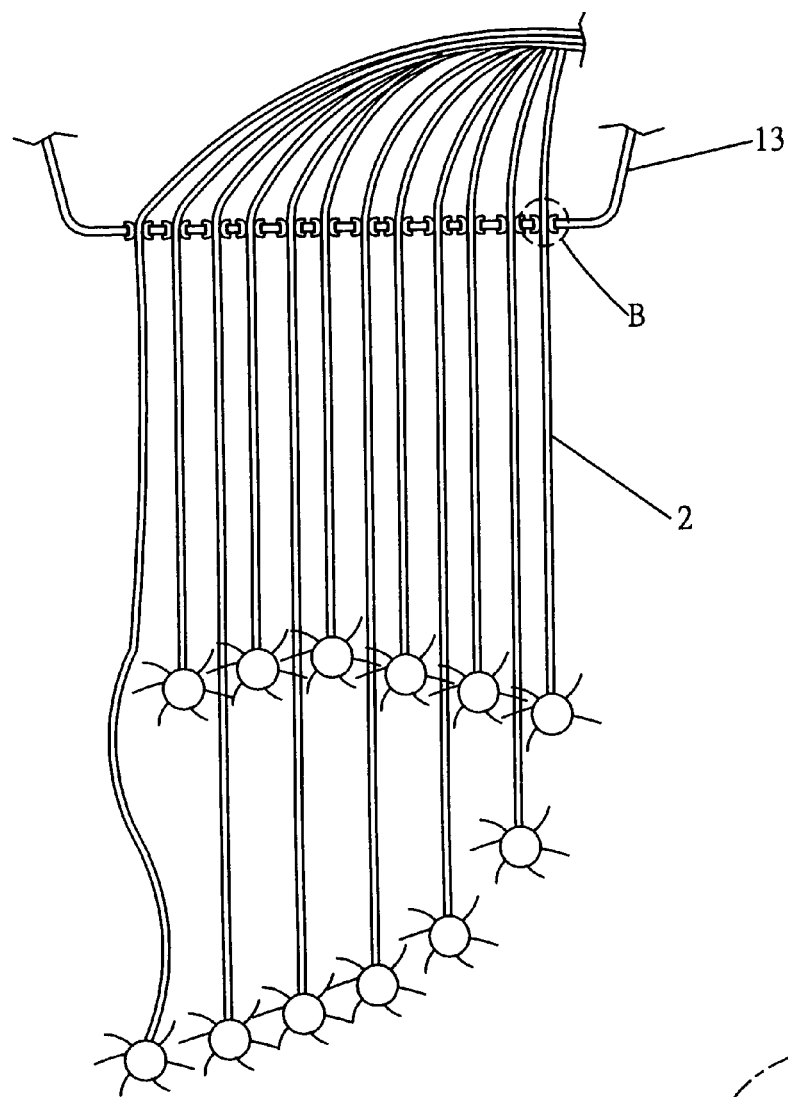
FIG. 5A shows another embodiment of a connecting method between the light emitting tube and a base plate according to the present invention.
Figure 5B:
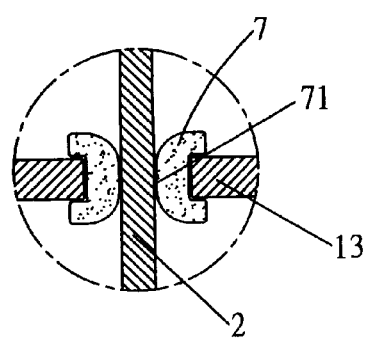
FIG. 5B shows a schematic view of the light emitting tube bound by a flexible ring according to the present invention.

Under circumstances whereby mass of the light emitting tube 2 is not large, the present invention can further adopt a single flexible ring 7 (see FIGS. 5A and 5B), which is disposed in the through hole 131 of the base plate 13, and an inner circular hole 71 provides for the light emitting tube 2 to pass therethrough. Resilient force of the binding ring 61 is used to press and securely bind a girth of the light emitting tube 2. The aforementioned simplified binding method is adopted when mass and gravitational effect of the light emitting tube 2 is relatively small, and provides free manual manipulation to transform structural form of the light.

Figure 6:
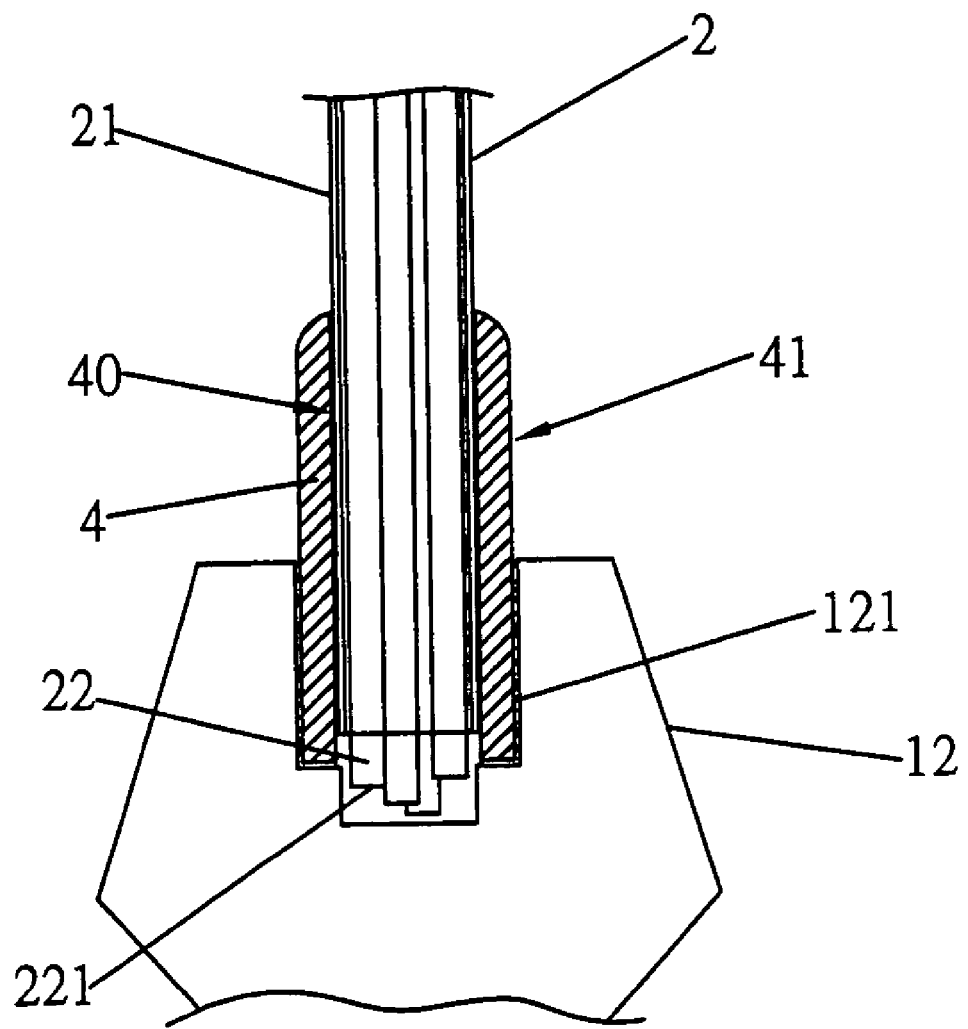
FIG. 6 shows a schematic view of the light emitting tube connected to a light expander according to the present invention.

Referring to FIG. 6, which shows an embodiment of a light expander 12 at the lower end of the light emitting tube 2, which uses a flexible retractive force of an inner circumferential surface 40 of the binding collar 4 to completely wrap tight around the circumferential surface of the protective sleeve 21 of the light emitting tube 2, thereby presenting the largest frictional area of contact.

When a coupling 41 of the binding collar 4 is pulled, internal diameter of the inner circumferential surface 40 reduces in size with corresponding increased strain and binding force on the outer circumference of the protective sleeve 21, thereby preventing the light expander 12 from easily falling off. The binding collar 4 can be made from flexible rubber material.

The connection groove 121 defined on the light expander 12 provides for the binding collar 4 to insert therein, and is secured by adopting methods including any compression joint method or any fastening method, details of which are not further disclosed herein.

Furthermore, because the binding collar 4 functions to separate and connect the light emitting tube 2 to the light expander 12, thus, light streams carried to projecting ends 221 of the optical fibers 22 are not subject to tainting, but completely projected outward.

Figure 7:
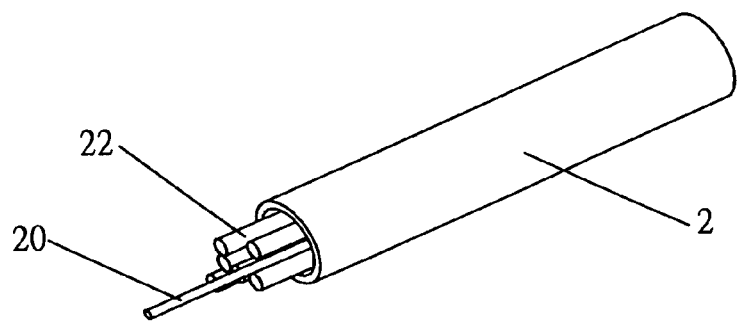
FIG. 7 shows a schematic view of a support wire disposed within the light emitting tube according to the present invention.
Figure 8:
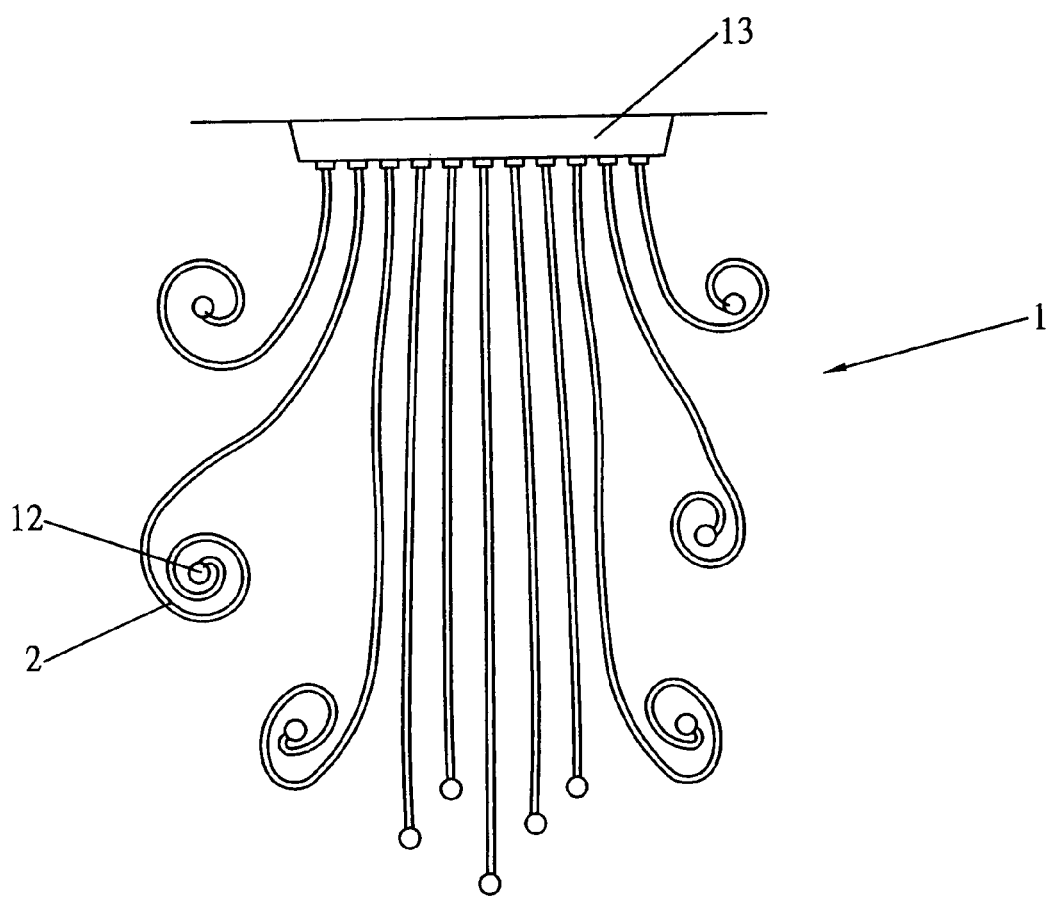
FIG. 8 shows a schematic view of the light emitting tubes of FIG. 7 after being flexed according to the present invention.

Referring to FIG. 7, a support wire 20 is further disposed within the light emitting tube 2 and adjacent to the optical fibers 22, and is made from metal material that allows manual manipulation thereof. After disposing the support wire 20 within the light emitting tube 2, a clearance is reserved between the optical fibers 22 and between the optical fibers 22 and the inner circumferential surface of the light emitting tube 2, thereby preventing mutual interference of the optical fibers 22 when flexing the light emitting tube 2, Referring to FIG. 8, which shows an embodiment depicting flexed light emitting tubes 2, wherein the light emitting tubes 2 extend outward from the base plate 13 and are flexed in a spiral fashion, thereby forming a configuration having a plurality of flexed winding patterns, which enhance the eye appeal of a beautiful curved form of the hanging light 1.

Figure 9:
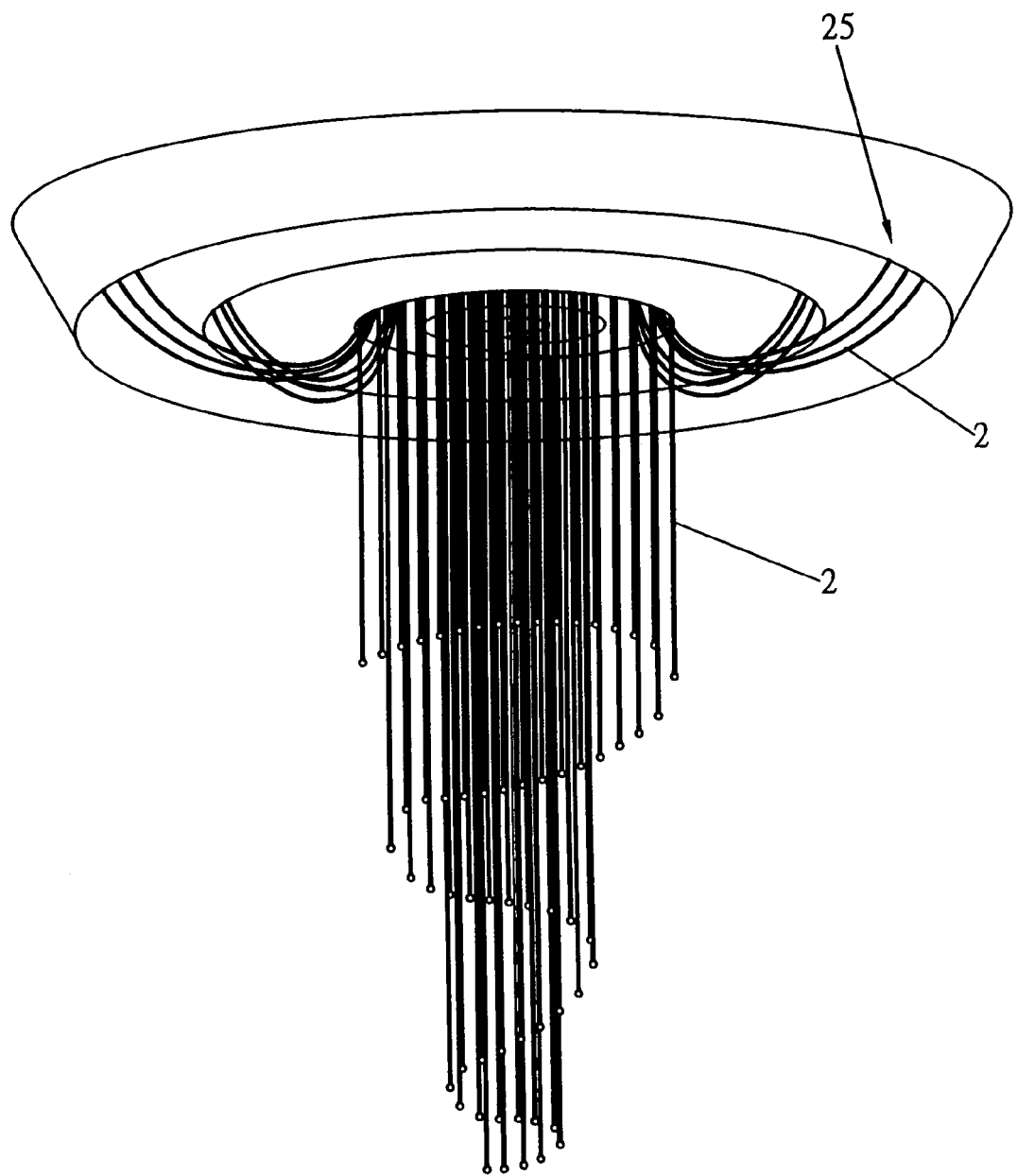
FIG. 9 shows a schematic view of another embodiment having expanded structural form according to the present invention.

Referring to FIG. 9, which shows free ends of a portion of the light emitting tubes 2 of the present invention curved back towards the ceiling and affixed to an upper portion of the fixture 25. Because of the flexible nature of the light emitting tubes 2, a middle portion of each of the upward curving light emitting tubes 2 naturally sag to form arc-shaped lines. After such a radialized distribution of the light emitting tubes 2, an amplified circular bloom-like decorative lighting arrangement is formed therefrom.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A three-dimensional decorative lighting comprising a plurality of light emitting tubes configured to transmit light from a light source, when connected to a light source, ends of which are gathered together in a light guide light source, a body of each of the light emitting tubes passes through a base plate, and a free end of each of the light emitting tubes hang down and are connected to a light expander, a plurality of the light emitting tubes are parallel arranged and forms a cylindrical decorative hanging light in accordance with design of the base plate; the three-dimensional decorative lighting is characterized in that each of the light emitting tubes are structured from a transparent protective sleeve, within which a plurality of optical fibers are disposed, a plurality of light spot generating windows having reflective sidewalls are distributed on a circumferential surface of each of the optical fibers, and a manually manipulable binding connector affixes each of the light emitting tubes to the base plate.

2. The three-dimensional decorative lighting as described in claim 1, wherein a metal support wire is further disposed within each of the light emitting tubes.

3. The three-dimensional decorative lighting as described in claim 1, wherein a supporting member is disposed at position of connection between the light emitting tube and the light expander.

4. The three-dimensional decorative lighting as described in claim 1, wherein an input end of each of the light emitting tubes are gathered together in a coupler.

5. The three-dimensional decorative lighting as described in claim 1, wherein a box for installing the light source is further disposed above the base plate.

6. The three-dimensional decorative lighting as described in claim 1, wherein a flexible binding collar is further attached to an end of each of the light emitting tubes, which provides for connecting to the light expander, and, moreover, enables replacement of the light expander.

7. The three-dimensional decorative lighting as described in claim 1, wherein reflecting inclined surfaces are defined in each of the miniature windows so as to accord with direction of light reflection.

8. A three-dimensional decorative lighting comprising a plurality of light emitting tubes, ends of which are gathered together in a light guide light source, a body of each of the light emitting tubes passes through a base plate, and a free end of each of the light emitting tubes hang down and are connected to a light expander, a plurality of the light emitting tubes are parallel arranged and forms a cylindrical decorative hanging light in accordance with design of the base plate; the three-dimensional decorative lighting is characterized in that each of the light emitting tubes are structured from a transparent protective sleeve, within which a plurality of optical fibers are disposed, a plurality of light spot generating windows are distributed on a circumferential surface of each of the optical fibers, and a manually manipulable binding connector affixes each of the light emitting tubes to the base plate wherein an optical extension cable is disposed between the coupler and a light source.

9. The three-dimensional decorative lighting described in claim 1, wherein the reflective sidewalls are configured to both reflect one fraction of the light across a width of at least one of the optical fibers to emit another fraction of the light from the light spot generating windows.

* * * * *